United States Patent
Sekine

(10) Patent No.: US 9,488,965 B2
(45) Date of Patent: Nov. 8, 2016

(54) NUMERICAL CONTROLLER INSTRUCTING A PLURALITY OF AXES USING A SINGLE INSTRUCTION

(71) Applicant: FANUC Corporation, Minamitsuru-gun, Yamanashi (JP)

(72) Inventor: Daisuke Sekine, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/547,271

(22) Filed: Nov. 19, 2014

(65) Prior Publication Data

US 2015/0168944 A1    Jun. 18, 2015

(30) Foreign Application Priority Data

Dec. 16, 2013 (JP) .................... 2013-259538

(51) Int. Cl.
*G05B 13/00* (2006.01)
*G05B 11/26* (2006.01)

(52) U.S. Cl.
CPC ..................... *G05B 11/26* (2013.01)

(58) Field of Classification Search
CPC ....... G05B 11/26; G05B 19/19; G05B 13/00
USPC ........ 318/560–689, 112; 700/13, 14, 37, 40, 700/25, 61, 63, 64, 67, 69, 186, 187, 189, 700/193, 194, 252; 137/88; 212/83; 217/125; 414/617; 415/49
See application file for complete search history.

(56) References Cited

U.S. PATENT DOCUMENTS

| | | | | |
|---|---|---|---|---|
| 5,144,211 A * | 9/1992 | Daggett | ............... | G05B 19/237 318/568.11 |
| 5,194,790 A * | 3/1993 | Niimi | ................... | G05B 19/253 112/102.5 |
| 6,216,056 B1 * | 4/2001 | Ito | .............................. | B25J 9/16 700/157 |
| 6,341,245 B1 * | 1/2002 | Ueta | .................... | G05B 19/404 318/564 |
| 6,404,160 B2 * | 6/2002 | Sagasaki | ............... | G05B 19/18 318/560 |
| 7,026,778 B2 * | 4/2006 | Aoyama | ............. | G05B 19/414 318/112 |
| 7,552,002 B2 * | 6/2009 | Endo | ...................... | G05B 19/41 701/50 |

(Continued)

FOREIGN PATENT DOCUMENTS

| | | |
|---|---|---|
| JP | S61-208509 A | 9/1986 |
| JP | S61-255407 A | 11/1986 |
| JP | 3-263208 A | 11/1991 |

(Continued)

OTHER PUBLICATIONS

Decision to Grant Patent dispatched Aug. 4, 2015 in Japanese Patent Application No. 2013-259538 (3 pages) with English Translation (3 pages).

(Continued)

*Primary Examiner* — Rita Leykin

(74) *Attorney, Agent, or Firm* — Drinker Biddle & Reath LLP

(57) ABSTRACT

In a numerical controller, a control table including the coefficient of an instruction pulse for each axis is stored and an instruction is provided for each axis of a machine based on the instruction pulse and the coefficient of the instruction pulse with reference to the control table. This eliminates the need for having a number of pulse generators and control cables corresponding to the number of motors, thereby providing a numerical controller with reduced hardware.

5 Claims, 9 Drawing Sheets

(56) References Cited

U.S. PATENT DOCUMENTS

| | | | |
|---|---|---|---|
| 8,831,768 B2* | 9/2014 | Ono | G05B 19/4093 318/568.15 |
| 2006/0090533 A1 | 5/2006 | Fujibayashi et al. | |

FOREIGN PATENT DOCUMENTS

| | | |
|---|---|---|
| JP | H10-340106 A | 12/1998 |
| JP | 2003-114706 A | 4/2003 |
| JP | 2006-122944 A | 5/2006 |
| JP | 2006-302207 A | 11/2006 |
| WO | WO-9725183 A1 | 7/1997 |

OTHER PUBLICATIONS

Notification of Reasons for Refusal dated May 12, 2015, along with its English-language translation, in corresponding Japanese Patent Application 2013-259538.

* cited by examiner

FIG.2

| | INPUT CHANNEL | ANALOG VOLTAGE INPUT CHANNEL | CONTROL MODE | PULSE MAGNIFICATION | SPEED MAGNIFICATION | TORQUE MAGNIFICATION | CONTROL SIGNAL | SIGNAL INPUT |
|---|---|---|---|---|---|---|---|---|
| FIRST AXIS | 1CH | — | POSITION | 2.0 | — | — | TORQUE LIMIT SIGNAL | 1 |
| SECOND AXIS | 1CH | — | POSITION | 1.0 | — | — | SERVO OFF SIGNAL | 1 |
| THIRD AXIS | — | 1CH | SPEED | — | 2.0 | — | — | — |
| FOURTH AXIS | — | 1CH | TORQUE | — | — | 2.0 | — | — |

FIG.5
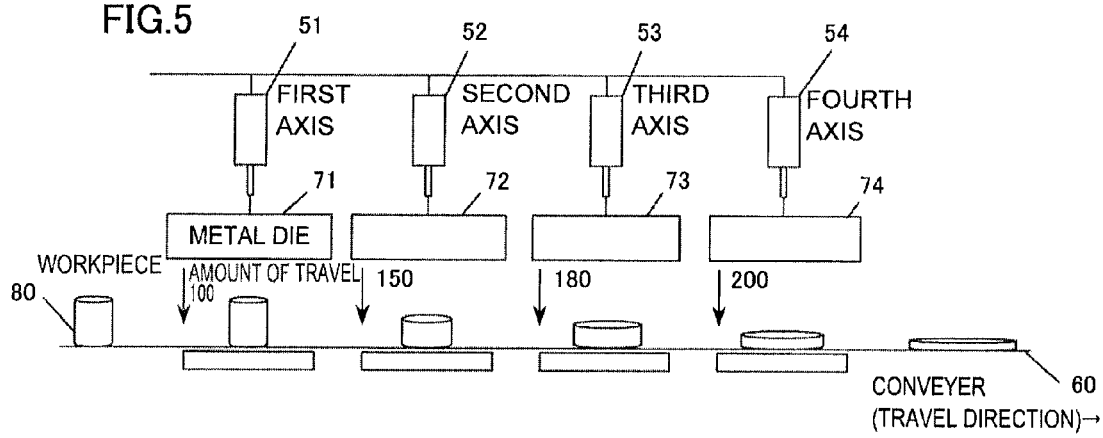
FIG.6
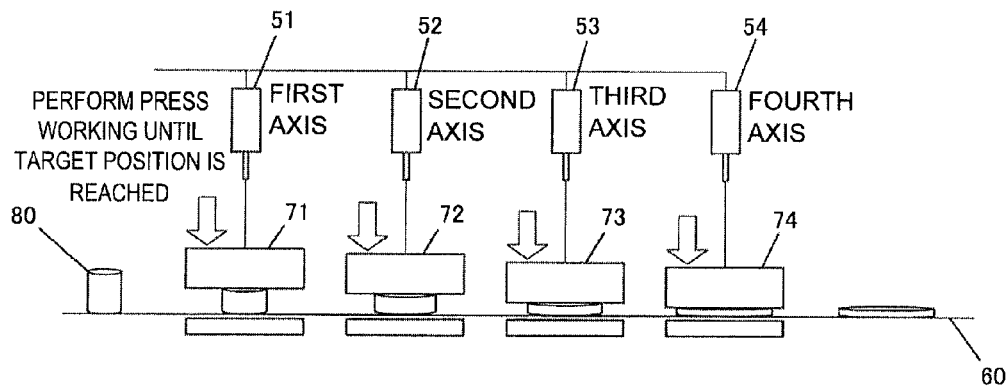
FIG.7
CONTROL TABLE 1
| | INPUT CHANNEL | CONTROL MODE | PULSE MAGNIFICATION | CONTROL SIGNAL |
|---|---|---|---|---|
| FIRST AXIS | 1CH | POSITION | 1.0 | TORQUE LIMIT SIGNAL |
| SECOND AXIS | 1CH | POSITION | 1.5 | TORQUE LIMIT SIGNAL |
| THIRD AXIS | 1CH | POSITION | 1.8 | TORQUE LIMIT SIGNAL |
| FOURTH AXIS | 1CH | POSITION | 2.0 | TORQUE LIMIT SIGNAL |

FIG.8
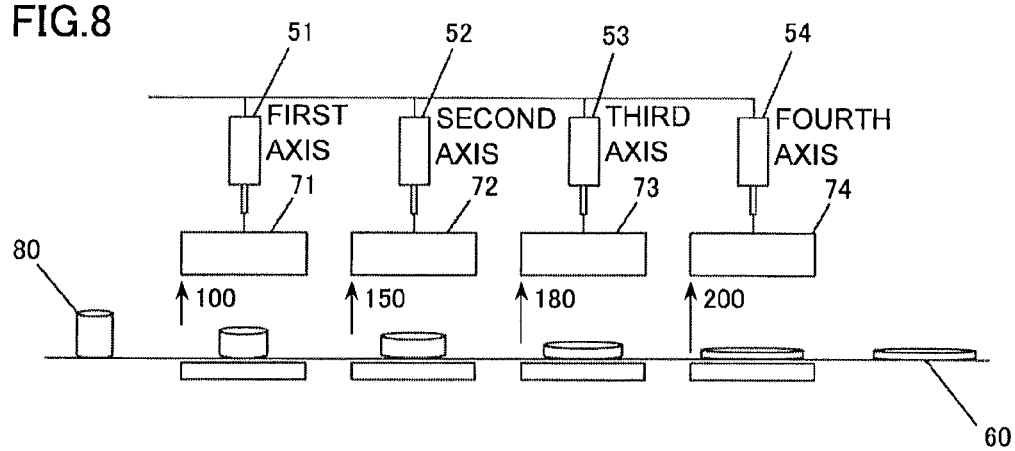
FIG.9
CONTROL TABLE 2
| | INPUT CHANNEL | CONTROL MODE | PULSE MAGNIFICATION | CONTROL SIGNAL |
|---|---|---|---|---|
| FIRST AXIS | 1CH | POSITION | −1.0 | TORQUE LIMIT SIGNAL |
| SECOND AXIS | 1CH | POSITION | −1.5 | TORQUE LIMIT SIGNAL |
| THIRD AXIS | 1CH | POSITION | −1.8 | TORQUE LIMIT SIGNAL |
| FOURTH AXIS | 1CH | POSITION | −2.0 | TORQUE LIMIT SIGNAL |
FIG.10
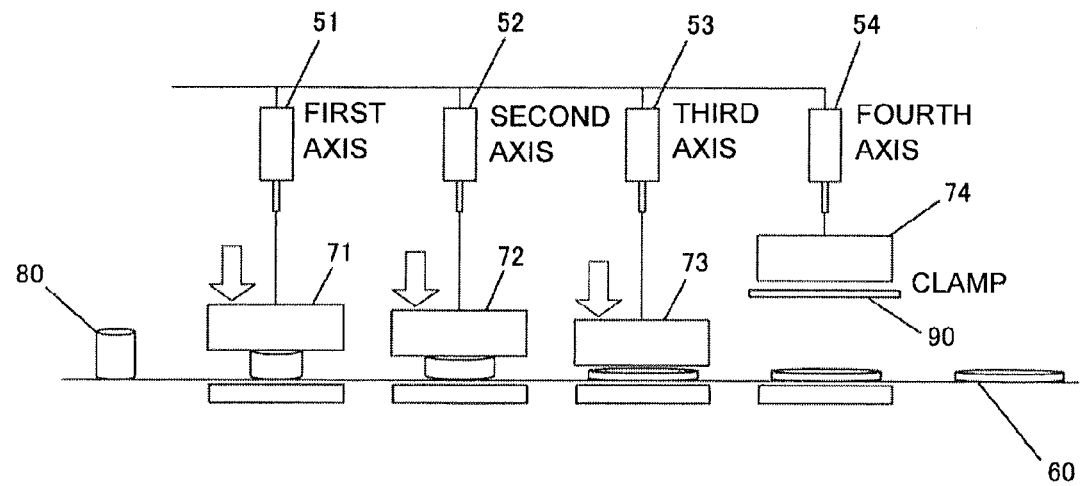

FIG.11

CONTROL TABLE 1

|  | INPUT CHANNEL | CONTROL MODE | PULSE MAGNIFICATION | CONTROL SIGNAL |
|---|---|---|---|---|
| FIRST AXIS | 1CH | POSITION | 1.0 | TORQUE LIMIT SIGNAL |
| SECOND AXIS | 1CH | POSITION | 1.5 | TORQUE LIMIT SIGNAL |
| THIRD AXIS | 1CH | POSITION | 1.8 | TORQUE LIMIT SIGNAL |
| FOURTH AXIS | 1CH | POSITION | 1.0 | SERVO OFF SIGNAL |

FIG.12

CONTROL TABLE 2

|  | INPUT CHANNEL | CONTROL MODE | PULSE MAGNIFICATION | CONTROL SIGNAL |
|---|---|---|---|---|
| FIRST AXIS | 1CH | POSITION | -1.0 | TORQUE LIMIT SIGNAL |
| SECOND AXIS | 1CH | POSITION | -1.5 | TORQUE LIMIT SIGNAL |
| THIRD AXIS | 1CH | POSITION | -1.8 | TORQUE LIMIT SIGNAL |
| FOURTH AXIS | 1CH | POSITION | -2.0 | SERVO OFF SIGNAL |

FIG.13

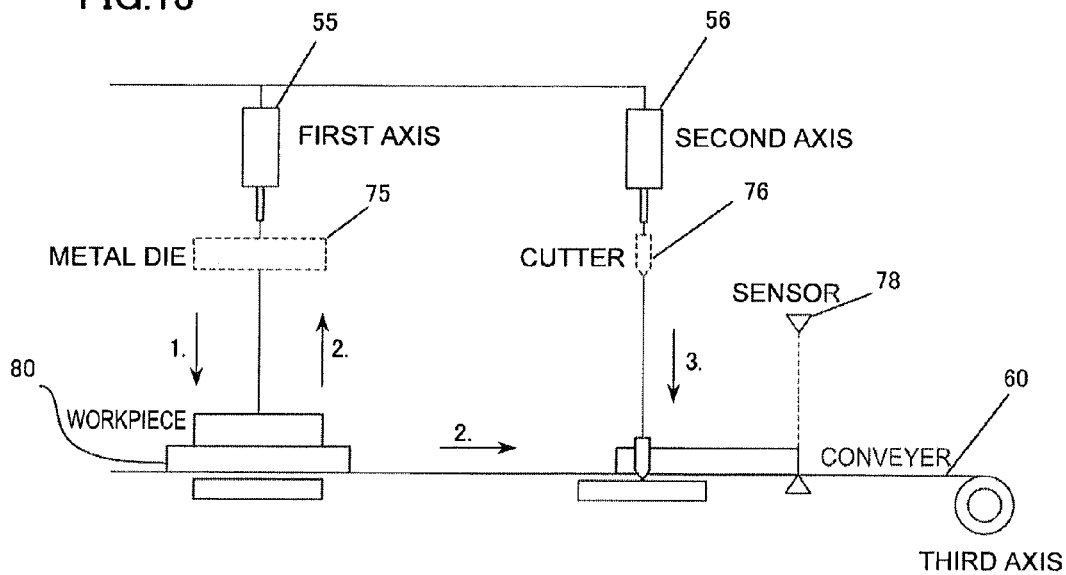

FIG.14

CONTROL TABLE 1

| | INPUT CHANNEL | CONTROL MODE | PULSE MAGNIFICATION | CONTROL SIGNAL |
|---|---|---|---|---|
| FIRST AXIS | 1CH | POSITION | 2.0 | TORQUE LIMIT SIGNAL |
| SECOND AXIS | 1CH | POSITION | 0.0 | — |
| THIRD AXIS (CONVEYER) | 1CH | POSITION | 0.0 | — |

FIG.15

CONTROL TABLE 2

| | INPUT CHANNEL | CONTROL MODE | PULSE MAGNIFICATION | CONTROL SIGNAL |
|---|---|---|---|---|
| FIRST AXIS | 1CH | POSITION | -2.0 | TORQUE LIMIT SIGNAL |
| SECOND AXIS | 1CH | POSITION | 0.0 | — |
| THIRD AXIS (CONVEYER) | 1CH | POSITION | 5.0 | — |

FIG.16

CONTROL TABLE 3

| | INPUT CHANNEL | CONTROL MODE | PULSE MAGNIFICATION | CONTROL SIGNAL |
|---|---|---|---|---|
| FIRST AXIS | 1CH | POSITION | 1.0 | SERVO OFF SIGNAL |
| SECOND AXIS | 1CH | POSITION | 3.0 | — |
| THIRD AXIS (CONVEYER) | 1CH | POSITION | 0.0 | — |

NUMERICAL CONTROLLER INSTRUCTING A PLURALITY OF AXES USING A SINGLE INSTRUCTION

RELATED APPLICATION DATA

This application claims priority under 35 U.S.C. §119 and/or §365 to Japanese Application No. 2013-25958 filed Dec. 16, 2013, the entire contents is incorporated herein by reference.

BACKGROUND OF THE INVENTION

1. Field of the Invention

The present invention relates to a numerical controller and, more specifically, to a numerical controller capable of instructing a plurality of axes using a single instruction.

2. Description of the Related Art

There is a numerical controller that drives a plurality of motors, drives the table and machining machine via a ball screw, and positions the workpiece and tool in a desired position. Such a numerical controller needs to make control so as to position the workpiece and tool in a desired position by instructing the motors about their operation.

When the motors are instructed to perform different types of operation, switching between instruction circuits has been performed based on the setting of the instruction program. In such a technique, when the number of control axes is increased, it is necessary to add an instruction program and install an additional instruction cable and instruction circuit.

FIG. 17 is a schematic view showing the structure of a numerical controller of the prior art, in which a servo driving apparatus 40 is connected to a numerical controller 20. A plurality of servo motors 50 are connected to the servo driving apparatus 40 and each servo motor 50 is driven by the corresponding axis instruction transmitted from the numerical controller 20.

In addition, an upper level controller 30 is connected to the numerical controller 20. The upper level controller 30 includes a plurality of pulse generator 32a, 32b, 32c, and 32d corresponding to the number of servo motors 50 and a plurality of control signal generators 34a and 34b. Of the plurality of pulse generators 32a, 32b, 32c, and 32d, the pulse generator 32a is connected to an input channel 1CH of the numerical controller 20, the pulse generator 32b is connected to an input channel 2CH of the numerical controller 20, the pulse generator 32c is connected to an input channel 3CH of the numerical controller 20, and the pulse generator 32d is connected to an input channel 4CH of the numerical controller 20.

There are a number of control signal generators 34a and 34b in association with the number of types of signals to be controlled. Since the types of signals to be controlled are two (signal 1 and signal 2) in the example shown in FIG. 17, two control signal generators 34a and 34b are provided. A number of (four in this example) pulse cables corresponding to the number of servo motors 50 run from each of the control signal generators 34a and 34b and are connected to the numerical controller 20 so that independent instructions are provided for the servo motors, respectively.

Japanese Patent Application Laid-Open No. 10-340106 discloses a technique (similar to the prior art technique above) for selecting a command from commands stored in a motion control module and providing an instruction for the control apparatus of each axis.

The numerical controller of the prior art technique above includes a number of pulse generators 32a, 32b, 32c, and 32d and pulse cables corresponding to the number of servo motors 50. Accordingly, when different servo motors 50 are instructed to provide different instructions for the axes, the instruction program and instruction circuit need to be changed. When the number of axes and the number of servo motors 50 that drive the axes are increased, the corresponding instruction cables and instruction circuits need to be added.

SUMMARY OF THE INVENTION

An object of the present invention is to provide a numerical controller that efficiently drives axes and motors driving the axes by reducing hardware.

A numerical controller according to a first aspect of the present invention includes a pulse generator, an instruction unit instructing one or more axes of a machine upon receiving an instruction pulse from the pulse generator, and a storage unit storing at least one control table in which a coefficient of the instruction pulse is set for each of the axes. The instruction unit instructs each of the axes based on the instruction pulse and the coefficient of the instruction pulse with reference to the control table.

A numerical controller according to a second aspect of the present invention includes an analog voltage output apparatus, an instruction unit instructing one or more axes of a machine upon receiving an analog voltage from the analog voltage output apparatus, and a storage unit storing at least one control table in which a control mode and a magnification are set for each of the axes. The control mode includes a speed control mode for performing speed control and a torque control mode for performing torque control. The instruction unit instructs each of the axes based on the control mode and the magnification with reference to the control table.

The numerical controller may further include a control signal generator, a signal input unit performing a signal input to one or more axes of the machine upon receiving a signal input from the control signal generator, and a storage unit storing at least one control table in which a signal used as a control signal is set for each of the axis and the signal input unit may perform a signal input to each of the axes based on the signal input and the signal used as the control signal with reference to the control table.

The numerical controller may include a table update unit updating content of the control table based on a structure of the axes of the machine and behavior of each of the axes.

The storage unit may store a plurality of control tables, and the numerical controller may further include a control table switching unit that switches a control table to a specific control table to be used, by using a special signal, from among the plurality of control tables.

The storage unit may store a plurality of control tables, and the numerical controller may further include a control table switching unit that switches a control table to a specific control table to be used, by using an external signal from a sensor, from among the plurality of control tables.

According to the present invention, there is provided the numerical controller that efficiently drives axes and motors driving the axes by reducing hardware.

BRIEF DESCRIPTION OF THE DRAWINGS

The objects and features described above and others of the present invention will become obvious from the descriptions in embodiments below with reference to attached drawings. Among the drawings:

FIG. 2 shows an example of a control table included in the numerical controller in FIG. 1;

FIG. 5 shows an example of applying the numerical controller according to the embodiment of the present invention to press working;

FIG. 6 shows an example of applying the numerical controller according to the embodiment of the present invention to press working;

FIG. 7 is an example of a control table used in the application example shown in FIGS. 5 and 6;

FIG. 8 shows an example of applying the numerical controller according to the embodiment of the present invention to the pulling back of the shafts of the press working after performing the press working shown in FIGS. 6 and 7;

FIG. 9 is an example of a control table used in the application example shown in FIG. 8;

FIG. 10 shows an example of applying the numerical controller according to the embodiment of the present invention to press working in which some axes of a plurality of axes are not used;

FIG. 11 an example of a control table (control table used during press working) used in the application example shown in FIG. 10;

FIG. 12 an example of a control table (control table used to pull back the axis that performed press working) used in the application example shown in FIG. 10;

FIG. 13 shows an example of applying the embodiment of the present invention to press working and plate cutting;

FIG. 14 shows an example of a control table (control table used during press working) used in the application example shown in FIG. 13;

FIG. 15 shows an example of a control table (control table used to pull back the shafts that performed press working) used in the application example shown in FIG. 13;

FIG. 16 shows an example of a control table (control table to which the control table shown in FIG. 15 is switched) used in the application example shown in FIG. 13.

DETAILED DESCRIPTION OF THE PREFERRED EMBODIMENTS

A numerical controller according to an embodiment of the present invention will be described with reference to FIG. 1.

Figure 17:
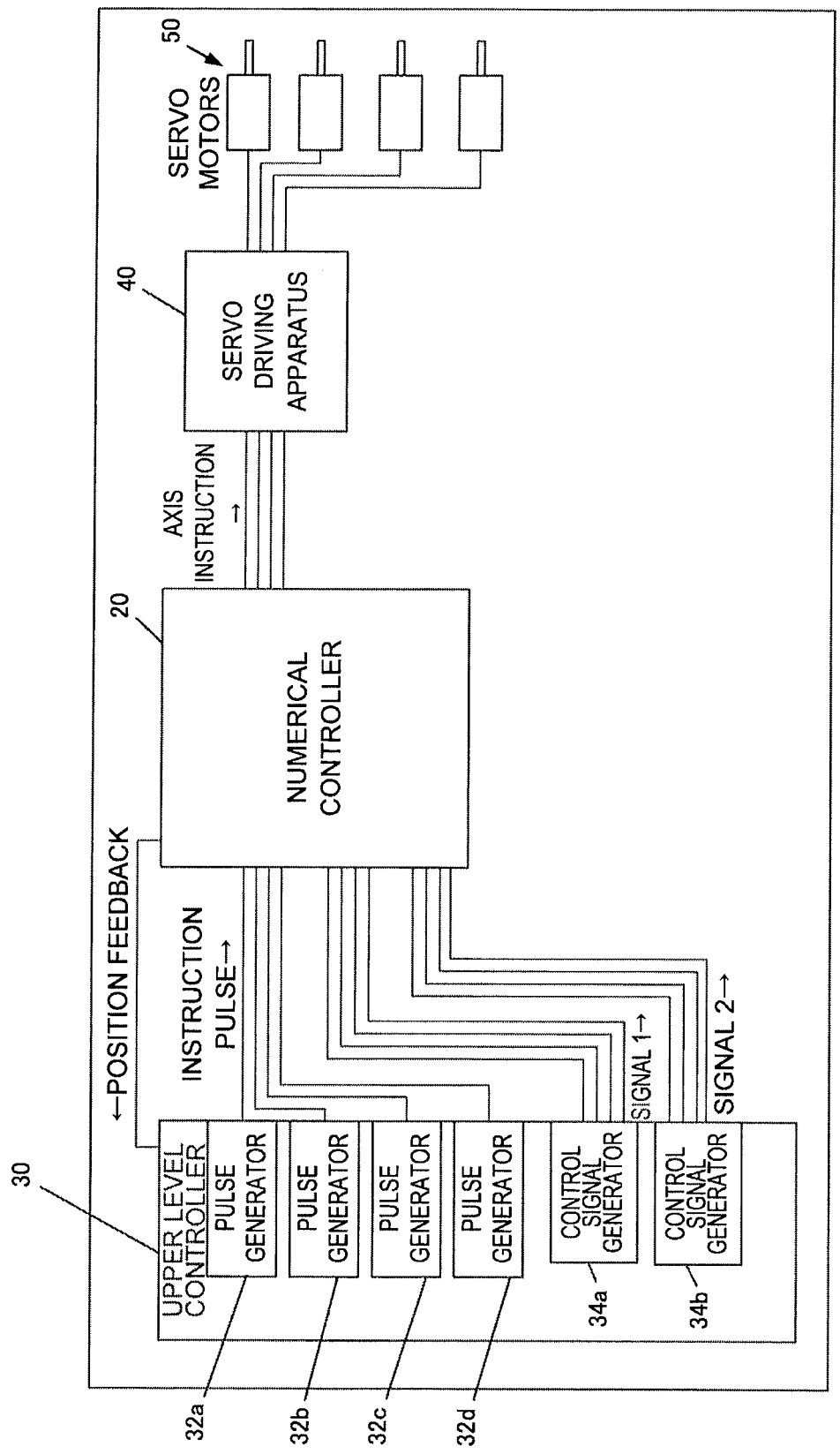
FIG. 17 is a schematic view showing the structure of the numerical controller of the prior art.

A servo driving apparatus 40 and servo motor 50a to 50d are similar to a servo driving apparatus 40 and servo motors 50 in FIG. 17 shown as the prior art technique. The servo motors 50 are driven based on axis instructions transmitted from a numerical controller 20.

The numerical controller 20 stores a plurality of control tables 10 (10a to 10d). These control tables 10 are used by being switched based on a control table switching instruction from a control table dedicated signal generator 36 or a sensor 38 described later.

In addition, an upper level controller 30 is connected to the numerical controller 20. The upper level controller 30 includes a pulse generator 32, a control signal generator 34, and the control table dedicated signal generator 36.

Figure 1:
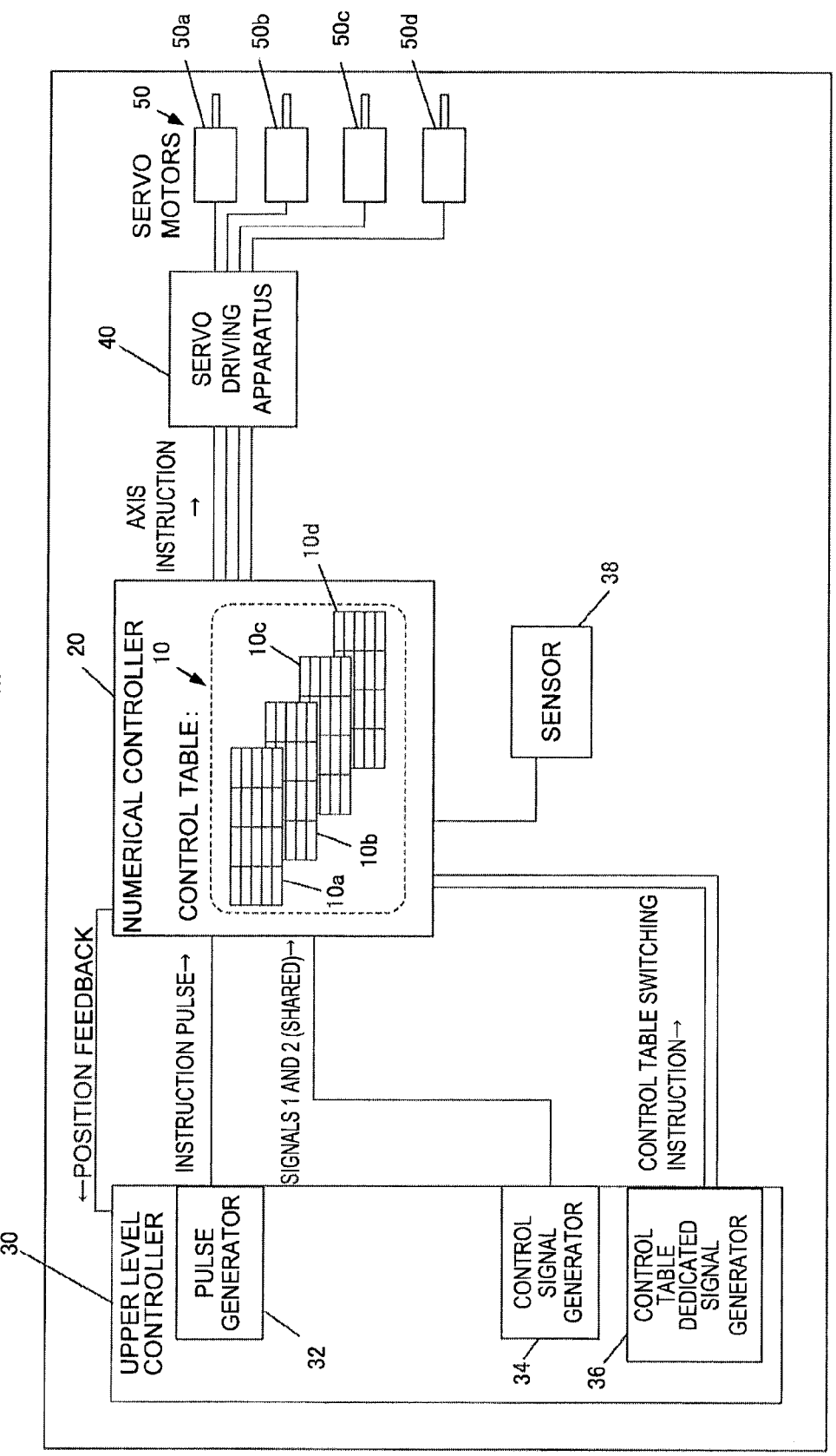
FIG. 1 is a schematic view showing a numerical controller according to an embodiment of the present invention.

In the numerical controller of the prior art technique shown in FIG. 17, there are a plurality of pulse generators 32 corresponding to the number of servo motors 50 and a plurality of control signal generators 34, but, in the numerical controller according to the present invention shown in FIG. 1, there is only one pulse generator 32 and only one control signal generator 34. In the present embodiment, the pulse generator 32 is connected to an input channel 1CH of the numerical controller 20.

In addition, in the numerical controller of the prior art technique shown in FIG. 17, a number of pulse cables corresponding to the number of servo motors 50 run from each of the control signal generators 34a and 34b and are connected to the numerical controller 20. However, in the present embodiment, one pulse cable runs from the control signal generator 34 and is connected to the numerical controller 20 as shown in FIG. 1.

Also in the present embodiment, the control table dedicated signal generator 36 is included in the upper level controller 30 and the control table dedicated signal generator 36 issues a control table switching signal to the numerical controller 20 to select the control table 10 to be enabled from a plurality of control tables 10 stored in the numerical controller 20.

A sensor 38 is also connected to the numerical controller 20 and the control table switching signal to be issued depending on the detection result of the sensor 38 can also be used to select the control table 10 to be enabled from the plurality of control tables 10 stored in the numerical controller 20.

The present embodiment instructs the servo driving apparatus 40 by reflecting a pulse instruction and a control signal input to the numerical controller 20 in the content of the control table 10. In the control table 10, as described later, the input channels of a pulse generator and an analog voltage input device that transmit an instruction, the control mode for position, speed, and torque, coefficients of pulse instruction for the position mode, speed for speed mode, and torque for torque mode, and signals used as control signals are set for each axis. These control tables 10 are created by a display setting operation by the numerical controller 20 and the control table to be enabled is selected by switching between a plurality of stored control tables 10 using a signal. Although the control table 10 is created by a display setting operation by numerical controller 20 in the present embodiment, it can also be created by the upper level controller 30.

If servo driving apparatus 40 is instructed in this way, even when the numbers of pulse generators, pulse cables, and signal cables are less than the number of servo motors, the servo motors 50 for driving the axes can be instructed individually, achieving reduction in hardware.

FIG. 2 shows an example of the control table 10.

As shown in FIG. 2, the control table 10 includes, for each axis (that is, for each servo motor driving each axis), an input channel 11, an analog voltage input channel 12, a control mode 13, a pulse magnification 14, a speed magnification 15, a torque magnification 16, a control signal 17, and a signal input 18. In the control table 10 in FIG. 2, for the input channels 11 and 12, the magnifications (the pulse magnification 14, the speed magnification 15, the torque magnification 16), the control signal 17, and the signal input 18, items that do not need to be specified are marked with "-".

In the input channel 11, set is the number of a channel through which the pulse generator 32 is connected to an axis instructed from the pulse generator 32. Since the number of pulse generators 32 is only one in the case of present embodiment, the input channel is set to 1CH.

In the analog voltage input channel 12, the number of a channel through which the analog voltage input device (not shown) is connected to an axis instructed from the analog voltage input device is specified. Since the number of analog voltage input devices is only one in the case of present embodiment, the analog voltage input channel 12 is set to 1CH.

In the control mode 13, a control mode selected from a position control, a speed control, and a torque control is set.

In the pulse magnification 14, set is a magnification by which the number of pulses per unit time specified from the pulse generator 32 is multiplied for the axis instructed from the pulse generator 32. The numerical controller 20 multiplies the number of pulses per unit time by the magnification set as the pulse magnification 14 and outputs the result to the servo driving apparatus 40.

In the speed magnification 15, set is a magnification by which the voltage specified from the analog voltage input device (not shown) is multiplied for the axis for which the speed control is set as the control mode 13. The numerical controller 20 multiplies the voltage specified by the analog voltage input device by the magnification set in the speed magnification 15 and outputs the result to the servo driving apparatus 40.

In the torque magnification 16, set is a magnification by which the voltage specified by the analog voltage input device is multiplied for the axis for which the torque control is set as the control mode 13. The numerical controller 20 multiplies the voltage specified by the analog voltage input device by the magnification set in the torque magnification 16 and outputs the result to the servo driving apparatus 40.

In the control signal 17, a signal assigned to an I/O device is set.

In the signal input 18, set is the number of a signal line through which the control signal generator 34 is connected to an axis that receives a signal input from the control signal generator 34. Since only one signal line is used in the present embodiment, the number of the signal line is set to 1.

Next, a flow of control performed by the numerical controller in FIG. 1 will be described with reference to the drawing (flowchart).

Figure 3:
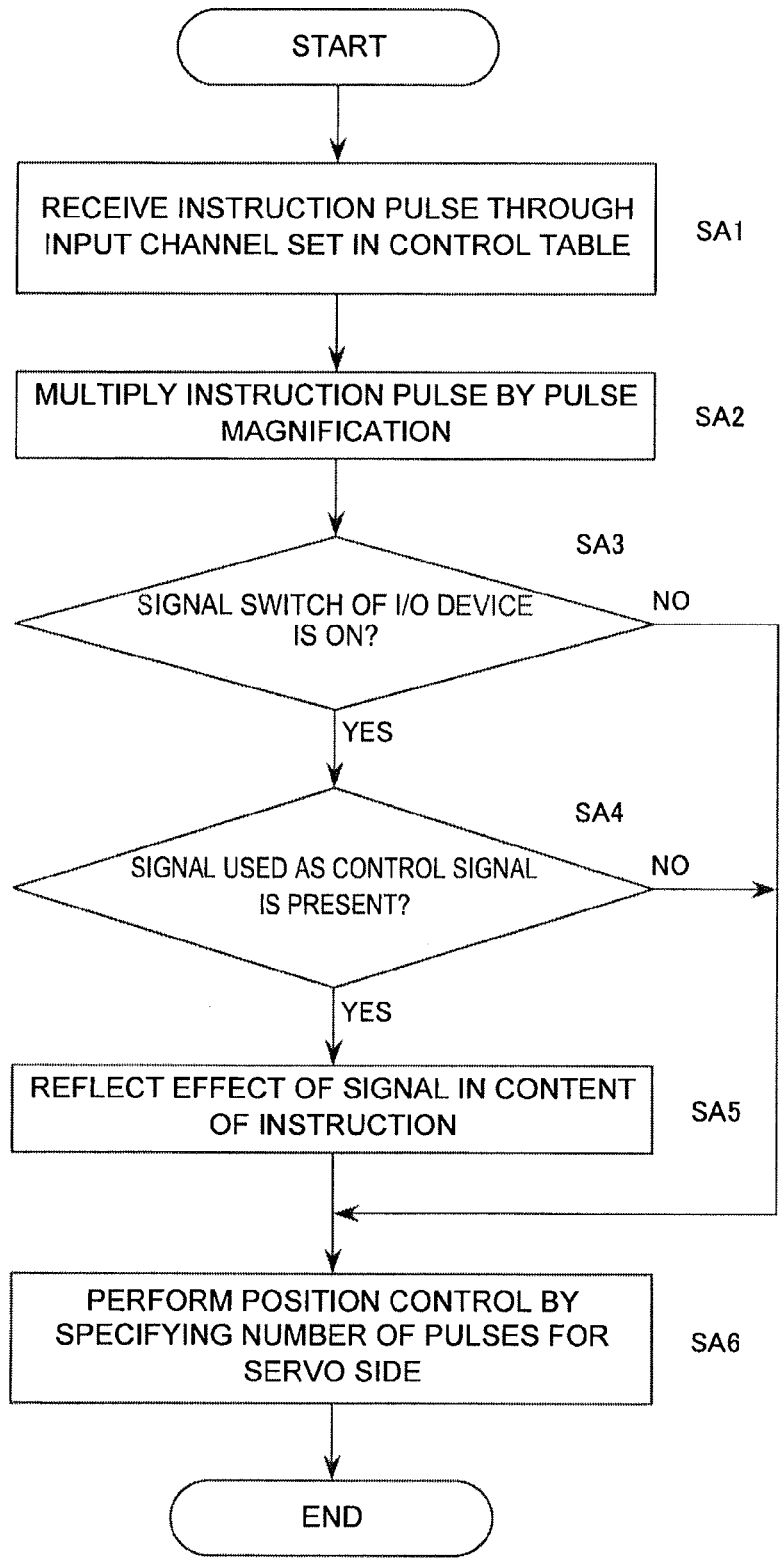
FIG. 3 is a flowchart showing a flow of position control performed by the numerical controller in FIG. 1 upon receiving an instruction from a pulse generator.

FIG. 3 is a flowchart showing a flow of position control performed by the numerical controller in FIG. 1 upon receiving an instruction from the pulse generator. The flow of this processing will be described for each step of the flowchart.

(Step SA1) Instruction pulses are received through the input channel 11 set in the control table 10.

(Step SA2) The number of pulses per unit time of the received instruction pulses is multiplied by the value of the pulse magnification 14 set in the control table 10.

(Step SA3) A decision is made as to whether the signal switch of a connected I/O device is on or not. If the signal switch is on (YES), the processing proceeds to step SA4. If the signal switch is not on (NO), the processing proceeds to step SA6.

(Step SA4) A decision is made as to whether or not a signal used as the control signal 17 is set in the control table 10. If a signal used as the control signal 17 is set (YES), the processing proceeds to step SA5. If a signal used as the control signal 17 is not set (NO), the processing proceeds to step SA6.

(Step SA5) The content of the control signal 17 is reflected in the content of an instruction.

(Step SA6) Position control is performed by specifying the number of pulses multiplied by the pulse magnification 14 for the servo driving apparatus 40 and then the processing is terminated.

Figure 4:
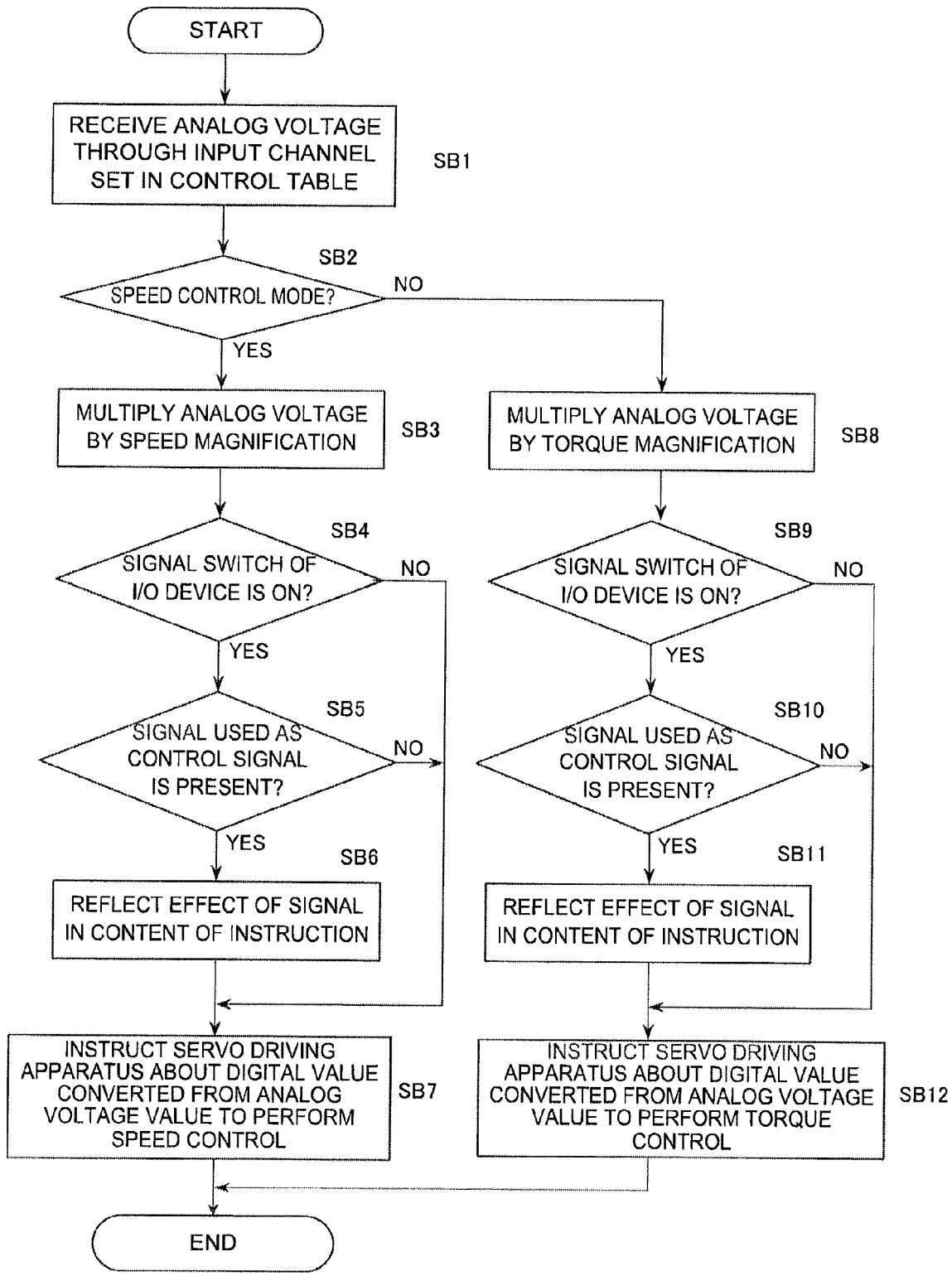
FIG. 4 is a flowchart showing a flow of speed control and torque control performed by the numerical controller in FIG. 1 upon receiving an instruction from analog voltage input device.

FIG. 4 is a flowchart showing a flow of speed control and torque control performed by the numerical controller in FIG. 1 upon receiving an instruction from analog voltage input device. The flow of this processing will be described for each step of the flowchart.

(Step SB1) An analog voltage is received through the analog voltage input channel 12 set in the control table 10.

(Step SB2) A decision is made as to whether the control mode 13 is a speed control mode or not. If the control mode 13 is the speed control mode (YES), the processing proceeds to step SB3. If the control mode 13 is not the speed control mode (NO) (that is, if the control mode 13 is a torque control mode), the processing proceeds to step SB8.

(Step SB3) The value of the received analog voltage is multiplied by the value of the speed magnification 15 set in the control table 10.

(Step SB4) A decision is made as to whether the signal switch of a connected I/O device is on or not. If the signal switch is on (YES), the processing proceeds to step SB5. If the signal switch is not on (NO), the processing proceeds to step SB7.

(Step SB5) A decision is made as to whether or not a signal used as the control signal 17 is set in the control table 10. If a signal used as the control signal 17 is set (YES), the processing proceeds to step SB6. If a signal used as the control signal 17 is not set (NO), the processing proceeds to step SB7.

(Step SB6) The content of the control signal 17 is reflected in the content of an instruction.

(Step SB7) Speed control is performed by specifying the analog voltage value multiplied by the speed magnification 15 for the servo driving apparatus 40 and then the processing is terminated.

(Step SB8) The value of the received analog voltage is multiplied by the value of the torque magnification 16 set in the control table 10.

(Step SB9) A decision is made as to whether the signal switch of a connected I/O device is on or not. If the signal switch is on (YES), the processing proceeds to step SB10. If the signal switch is not on (NO), the processing proceeds to step SB12.

(Step SB10) A decision is made as to whether or not a signal used as the control signal 17 is set in the control table 10. If a signal used as the control signal 17 is set (YES), the processing proceeds to step SB11. If a signal used as the control signal 17 is not set (NO), the processing proceeds to step SB12.

(Step SB11) The content of the control signal 17 is reflected in the content of an instruction.

(Step SB12) Torque control is performed by specifying the analog voltage value multiplied by the toque magnification 16 for the servo driving apparatus 40 and then the processing is terminated.

FIGS. 5 to 7 show an example of applying a numerical controller according to an embodiment of the present invention to press working.

In this press working, a workpiece conveyed by a conveyer 60 is pressed a plurality of times using assembly line production. Since the position at which the workpiece is pressed differs for each of axes (first axis, second axis, third axis, and fourth axis), the amount of travel for each of the axes is adjusted by the pulse magnification.

As shown in FIG. 5, a workpiece 80 is conveyed by the conveyer 60 and pressed sequentially. In the conveyance direction of the workpiece 80, a first axis 51, a second axis 52, a third axis 53, and a fourth axis 54 are disposed sequentially, and metal dies 71, 72, 73, and 74 are connected to the tips of these axes. The press working position differs for each of the axes. Specifically, the amount of travel of the first axis 51 is set to 100, the amount of travel of the second axis 52 is set to 150, the amount of travel of the third axis 53 is set to 180, and the amount of travel of the fourth axis 54 is set to 200. The differences in the amounts of travel are adjusted by the value of the pulse magnification. At this time, a torque limit signal is enabled and press working is performed until the target position is reached for each of the axes (see FIG. 6).

FIG. 7 shows an example of the control table 10 used for the press working shown in FIGS. 5 and 6.

It is assumed that the instruction pulse is 100 pulses and the reference amount of travel is 100. Since one pulse generator 32 is used in the present embodiment as shown in FIG. 1, the input channel 11 is set to "1CH" in either axis (the first axis, second axis, third axis, and fourth axis). In addition, since position control for press working is performed in either axis, the control mode 13 is set to "position control".

The pulse magnification 14 is set to a coefficient that indicates the relationship between the 100 pulses set as the instruction pulse and the actual amount of travel. Specifically, for the first axis with an amount of travel of 100, the pulse magnification 14 is set to "1.0"; for the second axis with an amount of travel of 150, the pulse magnification 14 is set to "1.5"; for the third axis with an amount of travel of 180, the pulse magnification 14 is set to "1.8"; for the fourth axis with an amount of travel of 200, the pulse magnification 14 is set to "2.0".

The control signal 17 is set to "torque limit signal" in either axis. The torque limit signal has the function of clamping the torque output of a motor at the limit value when turned on. This signal is used to prevent the machine from being broken by limiting the torque. Although the control signal 17 is set to "torque limit signal" in either axis of this control table 10, it may be set to "servo off signal". The servo off signal has the function of passing no current through the servo motor when turned on and performing no control and this signal is used not to move an axis.

These signals are assigned to the I/O device each time the control table 10 is switched. Therefore, if the switch on the I/O device side is not on, the signal to be transmitted does not function effectively. When using the control table 10, the switch on the I/O device side should be always turned on since the switch is shared with a plurality of axes. When the signal is turned on or off for each axis, the control table that has been set in this way needs to be selected.

Next, an example of applying the numerical controller according to the embodiment of the present invention to the pulling back of the axes after performing the press working shown in FIGS. 5 and 6 will be described with reference to FIGS. 8 and 9.

When the axis that has performed press working is pulled back, the control table 10 shown in FIG. 7 is switched to the control table 10 shown in FIG. 9 using a signal or the like from the control table dedicated signal generator 36 of the upper level controller 30.

Since the amount of travel of the first axis is 100, the amount of travel of the second axis is 150, and the amount of travel of the third axis is 180, and the amount of travel of the fourth axis is 200 as described above during press working, it is necessary to pull back the axes by the same amount in the opposite direction when pulling back the axes. Accordingly, the control table 10 shown in FIG. 9 includes the values of the pulse magnification 14 having the same absolute values as, and signs opposite to, the values of the pulse magnification 14 in the control table 10 shown in FIG. 7.

After pulling back the axes that have performed press working, the next workpiece is conveyed to the axes and then pressed.

Next, an example of applying the numerical controller according to the embodiment of the present invention to press working in which some axes of a plurality of axes are not used will be described with reference to FIGS. 10 to 12.

Specifically, as shown in FIG. 10, the numerical controller of the present embodiment is applied to press working in which, of the first axis 51, the second axis 52, the third axis 53, and the fourth axis 54, the fourth axis 54 is not used. For the fourth axis 54, which is not used, "servo off signal" is set instead of "torque limit signal" as the control signal 17 to prevent current from flowing through the servo motors 50. It is also possible to secure the fourth axis mechanically by attaching a clamp or the like to the fourth axis as shown in FIG. 10 in addition to changing the setting of the control signal 17 of the fourth axis from "torque limit signal" (FIG. 9) to "servo off signal" (FIGS. 11 and 12). It is also possible to secure the fourth axis by setting the pulse magnification 14 to "0".

Next, an example of applying the numerical controller according to the embodiment of the present invention to the combination of press working and plate cutting will be described with reference to FIGS. 13 to 16.

An example of combining press working and plate cutting will be shown in FIG. 13.

A metal die 75 is connected to the first axis 55 and a cutter 76 is connected to the second axis 56. In addition, the driving of the conveyer 60 is assigned to the third axis.

First, the first axis 55 performs press working and pulls back the axis that has performed press working. Then, the conveyer 60 conveys the workpiece 80 to the position of the second axis 56. When sensing the workpiece, the sensor 78 stops conveying by the conveyer 60, causes the second axis 56 to operate the cutter 76 to cut down the extra part of the workpiece.

FIG. 14 shows the control table 10 used during press working by the first axis 55.

For the first axis 55, the pulse magnification 14 is set to "2.0" for defining the amount of travel 200 and the control signal 17 is set to "torque limit signal". Since the second axis 56 and the third axis (the conveyer 60) do not operate during press working, the values of the pulse magnification 14 of these axes are set to "0.0". Accordingly, the first axis 55 performs press working.

FIG. 15 shows the control table 10 to which the control table in FIG. 14 is switched upon receiving a signal from the control table dedicated signal generator 36 or the like of the upper level controller 30 after the first axis 55 reaches the target position.

The pulse magnification 14 for the first axis 55 is set to "−2.0" to pull back the axis that has performed press working. The pulse magnification 14 for the third axis (the conveyer 60) is set to "5.0" to define the amount of travel 500 of the conveyer 60. This conveys the workpiece to the position of the second axis 56 while pulling back the first axis 55.

FIG. 16 shows the control table 10 to which the control table in FIG. 15 is switched when the sensor senses the workpiece during conveyance by the conveyer 60.

The control signal 17 for the first axis 55 is set to "servo off signal" to prevent operation. The pulse magnification 14 for the second axis 56 is set to "3.0" to define the amount of travel 300. The control signal for the second axis 56 does not need to be set to "torque limit signal" because the second axis 56 does not concern press working.

Although magnification values such as the pulse magnification, the speed magnification, and the torque magnification are used as coefficients stored in the control table in the present embodiment, the coefficients are not limited to multiples and may be other coefficients such as ordinal numbers or power of number.

According to the present embodiment, it is possible to reduce the number of pulse generators 32 and a part of pulse cables for specifying control signals, control signal interfaces, and signal cables, thereby enabling reduction in hardware.

The invention claimed is:

1. A numerical controller comprising:
   an analog voltage output apparatus;
   an instruction unit instructing one or more axes of a machine upon receiving an analog voltage from the analog voltage output apparatus; and
   a storage unit storing at least one control table in which a control mode and a magnification are set for each of the axes,
   wherein the control mode includes a speed control mode for performing speed control and a torque control mode for performing torque control and the instruction unit instructs each of the axes based on the control mode and the magnification with reference to the control table.

2. The numerical controller according to claim 1, further comprising:
   a control signal generator;
   a signal input unit performing a signal input to one or more axes of the machine upon receiving a signal input from the control signal generator; and
   a storage unit storing at least one control table in which a signal used as a control signal is set for each of the axes,
   wherein the signal input unit performs a signal input to each of the axes based on the signal input and the signal used as the control signal with reference to the control table.

3. The numerical controller according to claim 1, further comprising:
   a table update unit updating content of the control table based on a structure of the axes of the machine and behavior of each of the axes.

4. The numerical controller according to claim 1, wherein said storage unit stores a plurality of control tables; and
   said numerical controller further comprises a control table switching unit that switches a control table to a specific control table to be used, by using a special signal, from among the plurality of control tables.

5. The numerical controller according to claim 1, wherein said storage unit stores a plurality of control tables; and
   said numerical controller further comprises a control table switching unit that switches a control table to a specific control table to be used, by using an external signal from a sensor, from among the plurality of control tables.

* * * * *